(12) United States Patent
Brede et al.

(10) Patent No.: US 10,884,421 B2
(45) Date of Patent: Jan. 5, 2021

(54) METHOD FOR OPERATING AN AUTOMATICALLY MOVING CLEANING DEVICE

(71) Applicant: Vorwerk & Co. Interholding GmbH, Wuppertal (DE)

(72) Inventors: Maike Brede, Witten (DE); Pia Hahn, Schwelm (DE); Lorenz Hillen, Wuppertal (DE); Gerhard Isenberg, Cologne (DE); Harald Windorfer, Mettmann (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 16/058,139

(22) Filed: Aug. 8, 2018

(65) Prior Publication Data

US 2019/0049978 A1 Feb. 14, 2019

(30) Foreign Application Priority Data

Aug. 11, 2017 (DE) .......................... 10 2017 118 382

(51) Int. Cl.
*G05D 1/02* (2020.01)
*A47L 9/28* (2006.01)

(52) U.S. Cl.
CPC .......... *G05D 1/0219* (2013.01); *A47L 9/2826* (2013.01); *A47L 9/2852* (2013.01); (Continued)

(58) Field of Classification Search
None
See application file for complete search history.

(56) References Cited

U.S. PATENT DOCUMENTS

| 2005/0166355 | A1  | 8/2005 | Tani |
| 2005/0192707 | A1* | 9/2005 | Park .................... G05D 1/0246 700/259 |

(Continued)

FOREIGN PATENT DOCUMENTS

| DE | 10 2008 014 912 A1 | 9/2009 |
| DE | 10 2011 000 536 A1 | 8/2012 |

(Continued)

*Primary Examiner* — Peter D Nolan
*Assistant Examiner* — Demetra R Smith-Stewart
(74) *Attorney, Agent, or Firm* — Collard & Roe, P.C.

(57) ABSTRACT

A method for operating a cleaning device that automatically moves within an environment, wherein the cleaning device cleans a surface according to a prescribed work plan, wherein a detection device of the cleaning device detects contamination levels of several partial surface areas of the surface, wherein a cleaning operation of the cleaning device is varied as a function of the detection result, wherein an overall contamination level is determined for the surface from the contamination levels of several partial surface areas, and the cleaning operation is performed with cleaning parameters identical to the overall contamination level for the entire surface. In order to create an alternative to conventional operating methods, the determined overall contamination level is compared with at least one reference contamination level, specifically with an overall contamination level determined during a chronologically preceding cleaning activity.

9 Claims, 2 Drawing Sheets

(52) U.S. Cl.
    CPC ....... *A47L 2201/04* (2013.01); *A47L 2201/06* (2013.01); *G05D 2201/0203* (2013.01)

(56) References Cited

U.S. PATENT DOCUMENTS

| | | |
|---|---|---|
| 2007/0100496 A1 | 5/2007 | Forell |
| 2012/0095791 A1 | 4/2012 | Stefik et al. |
| 2012/0222224 A1* | 9/2012 | Yoon ................ A47L 11/33 15/52.1 |
| 2012/0247510 A1* | 10/2012 | Chen ................ G05D 1/0219 134/18 |
| 2012/0259481 A1 | 10/2012 | Kim |
| 2013/0025085 A1 | 1/2013 | Kim et al. |
| 2013/0030750 A1 | 1/2013 | Kim et al. |
| 2014/0124004 A1 | 5/2014 | Rosenstein et al. |
| 2014/0207282 A1 | 7/2014 | Angle et al. |
| 2014/0278252 A1* | 9/2014 | Wold ................ G01N 27/048 702/189 |
| 2015/0212520 A1 | 7/2015 | Artés et al. |
| 2016/0135655 A1 | 5/2016 | Ahn et al. |
| 2016/0206170 A1 | 7/2016 | Yi et al. |
| 2017/0007091 A1 | 1/2017 | Walz et al. |
| 2017/0325647 A1 | 11/2017 | Kwak |
| 2018/0074508 A1* | 3/2018 | Kleiner ................ G05D 1/0016 |
| 2018/0194006 A1 | 7/2018 | Gu et al. |
| 2018/0232134 A1 | 8/2018 | Ebrahimi Afrouzi et al. |
| 2018/0344114 A1 | 12/2018 | Scholten et al. |
| 2018/0344116 A1* | 12/2018 | Schriesheim ......... A47L 9/2857 |
| 2018/0360283 A1* | 12/2018 | Hackert .................. A47L 11/10 |
| 2018/0360285 A1* | 12/2018 | Erkek ....................... A47L 9/28 |
| 2019/0045992 A1 | 2/2019 | Brede et al. |
| 2019/0049976 A1 | 2/2019 | Erkek et al. |
| 2019/0049978 A1 | 2/2019 | Brede et al. |
| 2019/0049979 A1 | 2/2019 | Brede et al. |
| 2019/0094869 A1 | 3/2019 | Artes et al. |
| 2019/0155302 A1 | 5/2019 | Lukierski et al. |
| 2019/0176321 A1 | 6/2019 | Afrouzi et al. |

FOREIGN PATENT DOCUMENTS

| | | |
|---|---|---|
| EP | 1 711 873 B1 | 12/2012 |
| EP | 1 967 116 B2 | 5/2015 |

\* cited by examiner

METHOD FOR OPERATING AN AUTOMATICALLY MOVING CLEANING DEVICE

CROSS REFERENCE TO RELATED APPLICATIONS

Applicant claims priority under 35 U.S.C. § 119 of German Application No. 10 2017 118 382.5 filed on Aug. 11, 2017, the disclosure of which is incorporated by reference.

BACKGROUND OF THE INVENTION

1. Field of the Invention

The invention relates to a method for operating a cleaning device that automatically moves within an environment, wherein the cleaning device cleans a surface according to a prescribed work plan, wherein a detection device of the cleaning device detects contamination levels of several partial surface areas of the surface, wherein a cleaning operation of the cleaning device is varied as a function of the detection result, wherein an overall contamination level is determined for the surface from the contamination levels of several partial surface areas, and the cleaning operation is performed with cleaning parameters identical to the overall contamination level for the entire surface.

In addition, the invention relates to a cleaning device that automatically moves within an environment, which cleans a surface according to a prescribed work plan, wherein the cleaning device has a detection device for detecting contamination levels of several partial surface areas of the surface and a control device for controlling a cleaning operation of the cleaning device as a function of the detection result of the detection device, wherein the control device is set up to determine an overall contamination level of the surface from the contamination levels of several partial surface areas, and control the cleaning operation with cleaning parameters identical to the contamination level for the entire surface.

2. Description of the Related Art

Cleaning devices of the aforementioned kind as well as methods for their operation are known in prior art.

For example, the cleaning devices can be mobile robots, which can automatically perform a vacuuming task and/or wiping task.

For example, publications DE 10 2011 000 536 A1 and DE 10 2008 014 912 A1 disclose methods in conjunction with automatically traversable vacuuming and/or cleaning robots for cleaning floors. The robots are equipped with distance sensors, which can measure distances from obstacles, for example pieces of furniture or spatial boundaries. The measured distance data are used to generate an area map, based upon which a movement route can be planned that avoids a collision with obstacles. The distance sensors preferably operate without contact, for example using light and/or ultrasound. It is further known to provide the robot with means for all-round distance measurement, for example with an optical triangulation system, which is arranged on a platform that rotates around a vertical axis or the like. The acquired distance data are processed into an area map by means of a computing device of the robot and stored, so that access can be gained to this area map during an operation for orientation purposes.

It is further known in prior art to automatically control the operation of the cleaning device, for example by having a detection device of the cleaning device detect contamination levels of a surface and thereupon vary a cleaning operation as a function of the detected contamination. An individual item of contamination information is here allocated to each partial surface area of the surface, and the surface to be cleaned is divided into contaminated and less contaminated partial areas, for example so that a cleaning intensity can be individually adjusted in a targeted manner in each partial surface area.

SUMMARY OF THE INVENTION

Even though the solutions known in prior art have been proven effective in particular for intensively cleaning especially contaminated partial surface areas, the object of the invention is to create an alternative operating method for cleaning by means of the cleaning device, in particular for surfaces with a low contamination level, for example owing to a prolonged absence of a user.

In order to achieve this object, it is proposed that the determined overall contamination level be compared with at least one reference contamination level, specifically with an overall contamination level determined during a chronologically preceding cleaning activity.

The invention proposes that the determined overall contamination level be compared with at least one reference contamination level, specifically an overall contamination level determined during a chronologically preceding cleaning activity. As a result, a change in an overall contamination level over time can be determined, for example making it possible to infer a longer absence of people. In addition, the cleaning device can access a database, for example in tabular form, which contains cleaning parameters defined for specific overall contamination levels. Surfaces having an overall contamination level exceeding a specific reference contamination level are here processed with other cleaning parameters than surfaces whose overall contamination level lies under the reference contamination level. A plurality of different settings for cleaning parameters can be provided, wherein the application situations for the respective cleaning parameters are preferably also defined by a plurality of reference contamination levels.

The cleaning operation takes place in the same way for all partial surface areas. While the contamination level is measured within each or a plurality of partial surface areas of the surface, the cleaning operation is then not individually adjusted in each individual partial surface area to the respective contamination level that prevails there. Rather, an overall contamination level is determined from the individual contamination levels of the plurality of partial surface areas, which provides information about an overall contamination of the surface. For example, the overall contamination level can be an average contamination level for all partial surface areas taken together, or also a contamination level added up over all partial surface areas. It is basically also possible to prioritize the contamination level, in particular as a function of a floor type, since carpet fibers could be detected as dirt particles when cleaning a carpeted floor, which erroneously increases the contamination level. In order to determine the individual contamination levels of the partial surface areas, the cleaning device first traverses several or all partial surface areas of the surface, and there detects a respective local contamination level. For example, the detection process can take place during a pure measuring run of the cleaning device, or also during a cleaning operation.

In particular, it is proposed that the contamination levels be detected over a defined period in several individual measurements. For example, the cleaning device can travel around within a home for a period of a few minutes, wherein individual measurements are performed in various rooms or even partial areas of rooms. In addition, the defined period can also be the entire period of a cleaning operation of the cleaning device. It can further be provided that the contamination levels of the several partial surface areas be detected over a longer period, for example of several days or even several weeks, so as to be able to determine a change in the contamination level or overall contamination level that makes it possible to infer a longer absence of a user. If one or several users or inhabitants of the home are absent, less contamination inevitably arises within the rooms, so that the frequency of a cleaning operation or even the cleaning intensity of the cleaning on the entire surface can be adjusted. For example, a cleaning frequency could be automatically reduced during a prolonged absence, for example a vacation period.

It is proposed that the contamination levels of several partial surface areas be added together to yield an overall contamination level of the surface. In this embodiment, the amounts of the individual contamination levels are totaled to represent the overall contamination level of the entire surface. The higher the individual contamination levels of the individual partial surface areas, the higher the overall contamination level of the surface as well, so that suitable settings can be introduced for the cleaning operation to achieve the most optimal possible cleaning of each individual partial surface area.

An overall contamination level can basically also be calculated if a single, very strongly contaminated partial surface area exists within the home, while all other partial surface areas are not even contaminated at all, or have only a very slight contamination level by comparison. In this situation, a separate post-cleaning of the especially contaminated partial surface area can take place within the framework of a spot cleaning. However, practice has shown that taking into account an overall contamination level is sufficient in most instances, in particular for surfaces on which no unusual contamination of a partial surface area is present. In particular, it is enough to add together the individual contamination levels of several partial surface areas or determine an average contamination level in periods where there is little dirt, for example given a prolonged absence of people and/or animals within the premises.

In addition, it is proposed that the cleaning parameter involve changing the time interval between sequential cleaning activities. The frequency with which the surface is cleaned can thus be varied depending on the extent of the determined overall contamination level. Given a high detected overall contamination level, smaller intervals between sequential cleaning activities are set than at contrastingly lower overall contamination levels. The interval between cleaning activities can measure several hours, days or even weeks.

In particular, it is proposed that an interval between sequential cleaning activities be increased when a determined overall contamination level is less than a defined reference contamination level. For example, this embodiment is especially suited in cases where only a very low overall contamination level exists due to a prolonged absence of people, for example which nearly measures zero. The interval between the cleaning activities is then increased accordingly, so that the cleaning device does not travel around unnecessarily.

Depending on the determined overall contamination level, the cleaning parameter can further involve changing a cleaning power of the cleaning device. In particular, the cleaning power can be adjusted by setting a cleaning element and/or fan of the cleaning device. For example, if an overall contamination level drops below a defined reference contamination level, the cleaning power of the cleaning device can be increased. For example, the cleaning power is increased by raising the speed of a rotating cleaning element, which mechanically acts on the surface to be cleaned, or elevating a suction power of a motor-fan unit of the cleaning device, which vacuums suction material from the surface.

It is further proposed that a planned cleaning activity be chronologically delayed if the overall contamination level deviates from an earlier overall contamination level determined before or after a previously performed cleaning activity, wherein the deviation is less than a defined reference deviation. This embodiment involves determining by how much a calculated overall contamination level deviates relative to a reference contamination level. The deviation can have a positive or negative value, and accordingly a higher or lower overall contamination level. A currently determined overall contamination level is compared with a chronologically preceding overall contamination level, which was determined either before or after a last performed cleaning activity. If the difference between the overall contamination levels does not exceed a defined maximum deviation, a pending cleaning activity is postponed. For example, this embodiment is suitable for cleaning activities that are automatically controlled by a prescribed work plan. For example, the work plan can provide that a surface be cleaned every second day. However, if an overall contamination level of the surface as determined before or on the scheduled date suggests that nearly no contamination has taken place, the pending scheduled cleaning can be postponed or eliminated, so that in the aforementioned example, the surface is only cleaned later than planned, specifically when the defined reference deviation for the change in the overall contamination level has been exceeded.

It is further proposed that a user prescribe a defined reference contamination level and/or a defined reference deviation of an overall contamination level. In particular, the transmission can take place via a terminal device external to the cleaning device, wherein the user inputs the reference contamination level or defined reference deviation into the external terminal device, and from there transmits it to the cleaning device. For example, this manual setting can take place by means of an application installed on the external terminal device. In particular, the external terminal device can be a mobile terminal device of the user, especially preferably a mobile telephone, a tablet computer, a laptop or the like.

It can further be provided that both an overall contamination level of the surface and contamination levels of individual partial surface areas be displayed to the user in an area map. The overall contamination level or individual contamination levels can especially preferably be displayed on a display of an external terminal device, so that even an absent user can obtain information about the current contamination levels, for example in his or her home. In addition, the display of individual contamination levels of the partial surface areas informs the user about any potentially unusual contamination within a partial surface area, so that he or she can initiate special measures, for example a spot cleaning, so as to achieve an optimal cleaning in each partial surface area of the surface, even given a relatively inhomogeneous contamination of the entire surface. The graphic display on the area map directly provides the user with information about how strongly contaminated some partial surface area is. In particular, it can also be provided that the display used for display purposes be a touch-sensitive touchscreen, via which the user can make an input, for example mark a partial surface area in which a special spot cleaning is to take place in addition to a cleaning operation with the same cleaning parameters for the entire surface.

Apart from the method described above, the invention further also proposes a cleaning device that automatically moves within an environment, which cleans a surface according to a prescribed work plan, wherein the cleaning device has a detection device for detecting contamination levels of several partial surface areas of the surface and a control device for controlling a cleaning operation of the cleaning device as a function of the detection result of the detection device, and wherein the control device is set up to determine an overall contamination level of the surface from the contamination levels of several partial surface areas, and to control the cleaning operation with cleaning parameters identical to the overall contamination level for the entire surface.

According to the invention, the cleaning device is thus equipped with a control device, which in conjunction with the detection device is set up to control the cleaning device for implementing a method according to the invention described above. The control device is here capable of accessing one or several stored reference contamination levels that define the cleaning parameters to be applied for optimally cleaning the surface. The control device is set up to execute an algorithm that determines the overall contamination level of the surface from several individual contamination levels of individual partial surface areas, and control the cleaning operation of the cleaning device as a function of the overall contamination level, wherein the cleaning device is controlled with the same cleaning parameters in each of the partial surface areas. To this end, the control device compares the overall contamination level with preferably one or several reference contamination levels, which define optimal cleaning parameters for cleaning the surface with these contamination levels. Otherwise, the advantages and features of the cleaning device according to the invention are as described above in relation to the method according to the invention.

BRIEF DESCRIPTION OF THE DRAWINGS

The invention will be explained in greater detail below based on exemplary embodiments. Shown on.

DETAILED DESCRIPTION OF THE PREFERRED EMBODIMENTS

Figure 1:
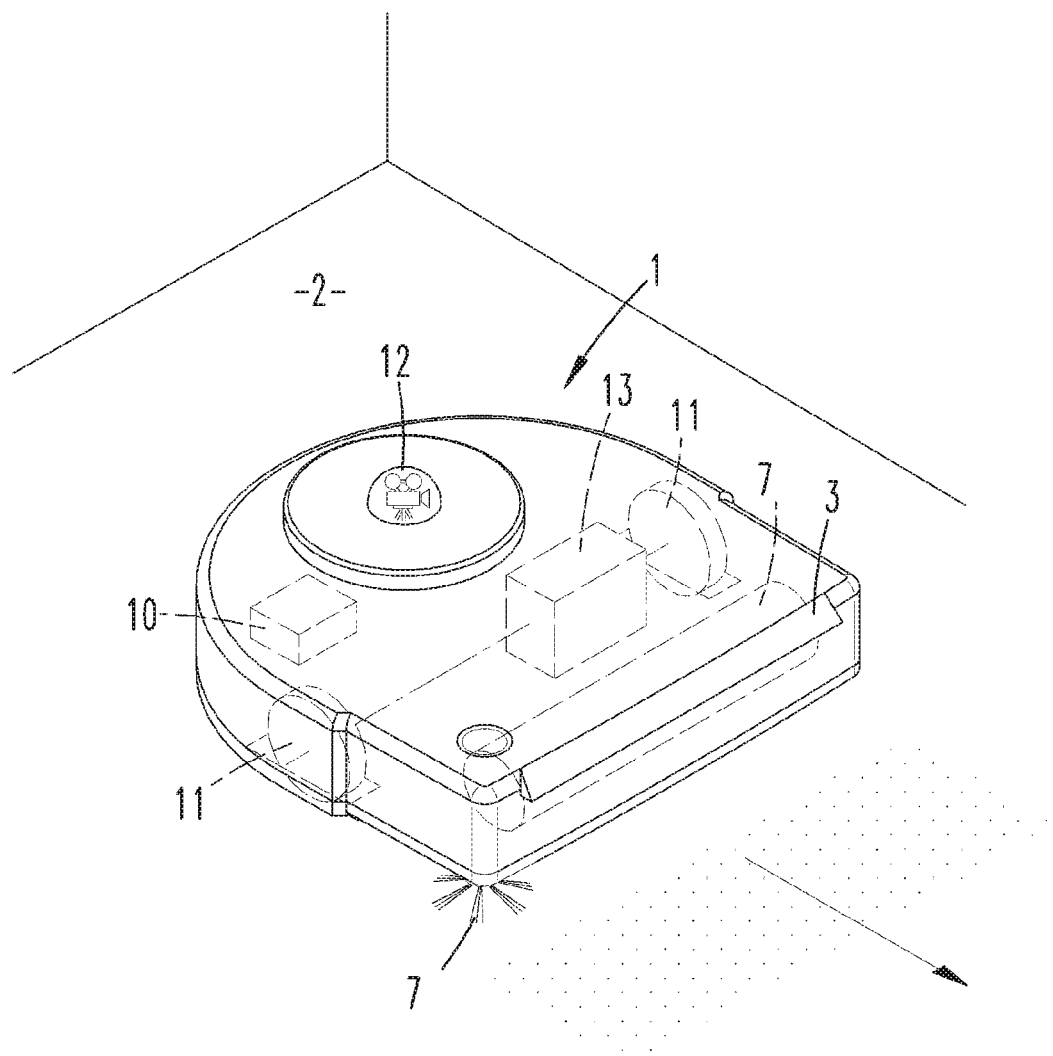
FIG. 1 is a perspective view of a cleaning device.

FIG. 1 shows a cleaning device 1, which is here designed as a vacuuming robot. The cleaning device 1 has wheels 11 driven by means of an electric motor 13, with which the cleaning device 1 can move within an environment, i.e., on a surface 2 to be cleaned. In addition, the cleaning device 1 has cleaning elements 7, here specifically a lateral brush protruding laterally over a housing of the cleaning device 1 as well as a bristle roller, which can be rotated around a rotational axis. The bristle roller is horizontally oriented in the usual operating position of the cleaning device 1 shown here relative to its longitudinal extension, i.e., essentially parallel to the surface 2 to be cleaned. The cleaning elements 7 mechanically act on the surface 2 to be cleaned, and in the process loosen dirt from the surface 2 to be cleaned. In addition, the cleaning device 1 has a suction mouth opening (not shown in any more detail) in the area of the cleaning elements 7, with which air loaded with suction material can be vacuumed into the cleaning device 1 by means of a motor-fan unit. The cleaning device 1 has a rechargeable battery (not shown) for supplying power to the individual electrical components of the cleaning device 1, for example the electric motor 13 of the wheels 11, the cleaning elements 7 and other electronics.

The cleaning device 1 further has a distance measuring device 12, for example which here has a triangulation measuring device. The distance measuring device 12 is arranged inside of the housing of the cleaning device 1, and specifically has a laser diode, the emitted light beam of which is guided out of the housing by a diverting mechanism, and can rotate around a rotational axis that is perpendicular in the depicted orientation of the cleaning device 1, in particular with a measuring angle of 360 degrees. This enables an all-round distance measurement around the cleaning device 1. The distance measuring device 12 measures distances from obstacles, for example pieces of furniture and spatial boundaries, within the environment of the cleaning device 1.

In addition, the cleaning device 1 has a detection device 3, here specifically a dust sensor arranged at the front viewed in the traveling direction of the cleaning device 1, which can detect a contamination of the partial surface areas 4, 5, 6 of the surface 2 currently being traversed by the cleaning device. For example, the detection device 3 is here an image acquisition device (not shown in any more detail), in particular a camera, which records images of the surface 2 and compares the latter with images of a reference contamination. However, the detection device 3 can alternatively also have a different design. For example, the detection device 3 can have a particle sensor, which has allocated to it a suction channel through which the air loaded with suction material is vacuumed into the cleaning device 1. The cleaning device 1 also has a control device 10, which is designed to control the detection device 3 for detecting contamination levels within each of the partial surface areas 4, 5, 6, determine an overall contamination level of the surface 2 from the individual contamination levels, compare the latter with one or several reference contamination levels, and thereupon control the cleaning device 1 in such a way that the surface 2 as a whole is cleaned with the same cleaning parameters, so that each partial surface area 4, 5, 6 of the surface 2 is cleaned in the same way and preferably with the same cleaning intensity.

Figure 2:
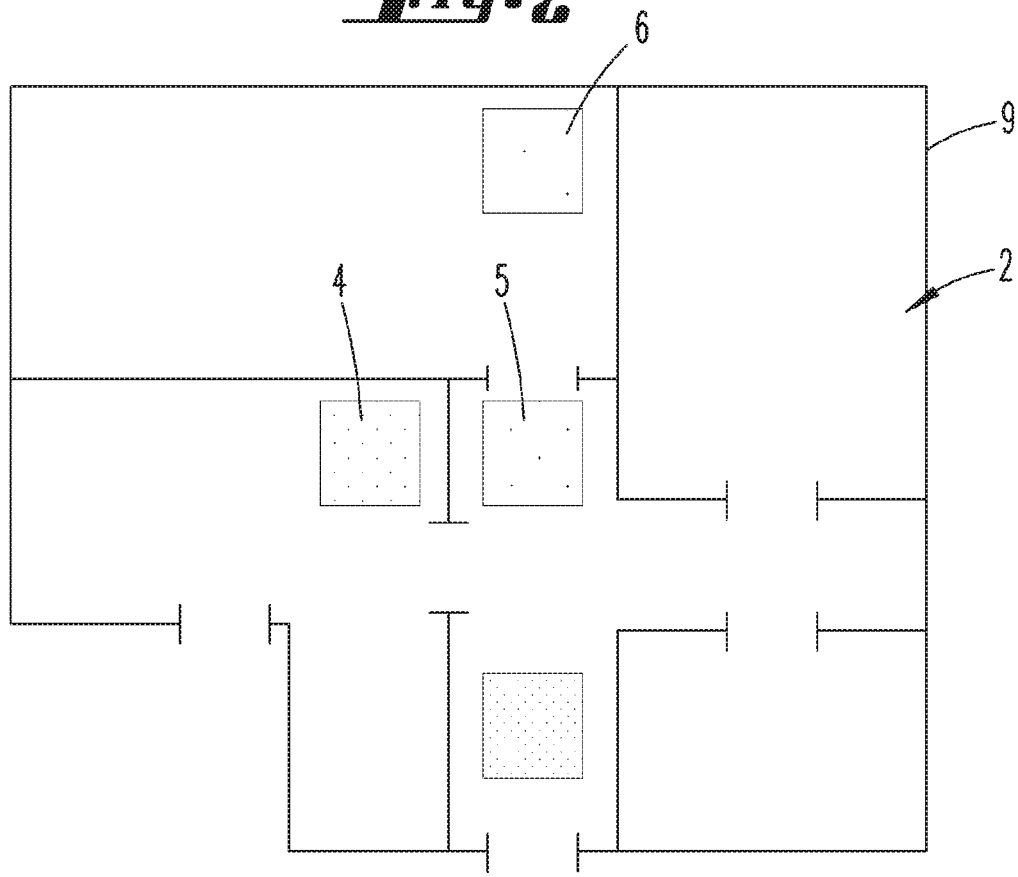
FIG. 2 is an area map of the cleaning device with a surface having several partial surface areas.

FIG. 2 shows an area map 9, which was generated from the detection results of the distance measuring device 12. While automatically moving, the cleaning device 1 can use the area map 9 to localize itself and avoid obstacles when moving. The area map 9 contains a layout of a home with several rooms, which have a surface 2 that turn has individual partial surface areas 4, 5, 6. The area map 9 here usually has obstacles not shown in any more detail, in particular pieces of furniture and the like, which are relevant for the collision-free movement of the cleaning device 1. Each of the partial surface areas 4, 5, 6 of the surface 2 here has an individual contamination level, which depends among other things on activities done by people or animals inside of the home. In addition, the contamination level can also be caused by plants or airflows. For example, a contamination level in a kitchen can routinely be higher than a contamination level in a study. The contamination levels of the respective partial surface areas 4, 5, 6 are detected by means of the detection device 3 of the cleaning device 1, wherein the detection can take place either during a cleaning run, or in advance of a cleaning during purely an exploratory run. The individual contamination levels of the partial surface areas 4, 5, 6 detected by the detection device 3 are recorded in the area map 9. For example, partial surface areas 5 and 6 have a relatively low contamination level, while contamination in partial surface area 4 is more extensive by comparison.

Figure 3:
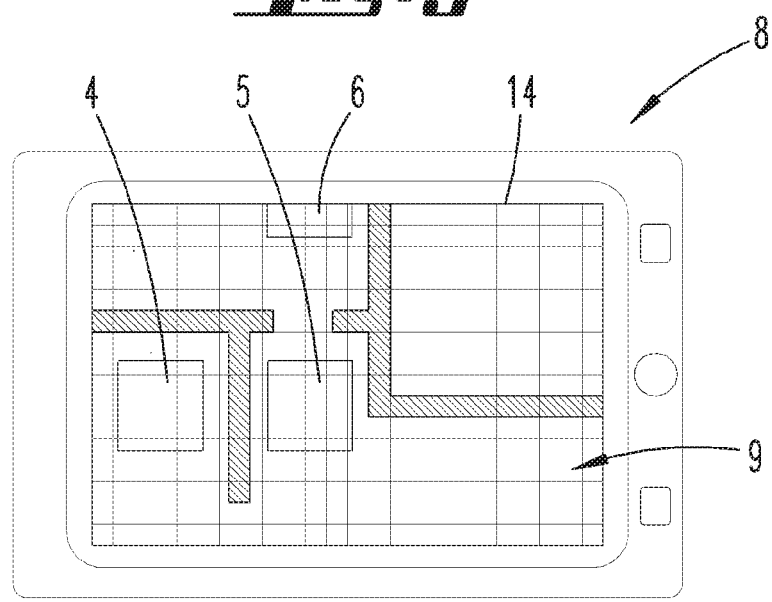
FIG. 3 is an external terminal device which displays the area map of the cleaning device.

FIG. 3 shows an external terminal device 8 with a display 14, which displays the area map 9. For example, the external terminal device 8 is here a tablet computer, the display 14 of which is a touchscreen, with which a user input can be simultaneously transmitted to the external terminal device 8. The external terminal device 8 has installed on it an application that allows the user to remotely control the cleaning device 1.

The invention now functions in such a way that the cleaning device 1 traverses the surface 2 and in so doing detects a current local contamination on several or all partial surface areas 4, 5, 6 of the surface 2. The detection device 3 transmits the detection results to the control device 10, which thereupon first determines the local contamination levels, and then from that an overall contamination level for the entire surface 2. The overall contamination level can here be calculated by adding up the individual local contamination levels of the partial surface areas 4, 5, 6. However, it would alternatively also be possible to determine an average contamination level. The control device 10 then compares the calculated overall contamination level of the surface 2 with a reference contamination level, specifically an overall contamination level determined during an earlier cleaning activity, which is stored in a memory of the cleaning device 1 or also in an external memory. Each of the stored reference contamination levels have allocated to them specific cleaning parameters of the cleaning device 1, which enable an optimal cleaning of a surface 2 with such contamination levels. For example, a cleaning parameter can be a specific time interval between sequential cleaning activities of the cleaning device 1 and/or a specific cleaning power of the cleaning device 1. For example, the cleaning power can be achieved by a specific setting of a cleaning element 7 or a fan of the cleaning device 1. When comparing the determined overall contamination level with the reference contamination level, the control device 10 determines a correlation or similarity with a reference contamination level. The control device 2 thereupon accesses the cleaning parameter allocated to the closest reference contamination level, and controls the cleaning device 1 in such a way that it cleans the entire surface 2 with these cleaning parameters.

In addition, the operation of the cleaning device 1 can be incorporated into a work plan, for example, which provides cleaning activities for the cleaning device 1 at specific times or in recurring time intervals. For example, a standard setting can provide for a daily cleaning of the surface 2. Before each cleaning operation, an exploratory run can take place, during which the detection device 3 of the cleaning device 1 detects the current contamination of partial surface areas 4, 5, 6. An overall contamination level determined from the detection results can thereupon be compared with an overall contamination level determined chronologically before a cleaning activity performed last. If it is here determined that the current overall contamination level is less than the previous overall contamination level, the planned cleaning activity can be postponed. In particular, a reference deviation can in this conjunction be defined, which indicates a reference for the difference between the two overall contamination levels. If the current overall contamination level lies within the limits of the defined reference deviation (+/−), a cleaning activity can be delayed or even be omitted entirely, so that cleaning does not take place on the planned day at all, with the next cleaning activity instead happening only on the following day, provided the preconditions for it are given.

The user can be informed by his or her external terminal device 8 about current contamination levels within the partial surface areas 4, 5, 6 as well as about the overall contamination level. If he or she here determines that one of the partial surface areas 4, 5, 6 has a contamination level that clearly deviates from the contamination levels of other partial surface areas 4, 5, 6, he or she can manually initiate a spot cleaning of the especially contaminated partial surface area 4, 5, 6, for example via manual input on the display 14. The external terminal device 8 can further also be used to define previous overall contamination levels as reference contamination levels or corresponding reference deviations, and make them available to the control device 10 of the cleaning device 1. As a consequence, the user him or herself can decide on threshold values that would lead to a more or less frequent cleaning, a more intensive or less intensive cleaning, or the like.

REFERENCE LIST

1 Cleaning device
2 Surface
3 Detection device
4 Partial surface area
5 Partial surface area
6 Partial surface area
7 Cleaning element
8 External terminal device
9 Area map
10 Control device
11 Wheel
12 Distance measuring device
13 Electric motor
14 Display

What is claimed is:

1. A method for operating a cleaning device that automatically moves within an environment, comprising:
   cleaning a surface according to a prescribed work plan;
   detecting with a detection device of the cleaning device contamination levels of several partial surface areas of the surface, and varying a cleaning operation of the cleaning device as a function of a detection result,
   determining an overall contamination level for the surface from the contamination levels of several partial surface areas, wherein the overall contamination level is determined by adding up the contamination levels of the several partial surface areas or by determining an average contamination level from the contamination levels of the several partial surface areas,
   comparing the determined overall contamination level with at least one reference contamination level, that coincides with an overall contamination level determined during a chronologically preceding cleaning activity,
   performing a cleaning operation with cleaning parameters corresponding to the overall contamination level for the entire surface, and wherein the cleaning operation takes place with the same cleaning parameters for at least the several partial surface areas in which a contamination level has been detected, and wherein the cleaning operation is not individually adjusted in each individual partial surface area to the respective contamination level that prevails in the individual partial surface area.

2. The method according to claim 1, wherein the contamination levels of the partial surface areas are detected over a defined period in several individual measurements.

3. The method according to claim 1, wherein the contamination levels of several partial surface areas are added together to yield an overall contamination level of the surface.

4. The method according to claim 1, wherein the cleaning parameter involves changing the time interval between sequential cleaning activities, and/or changing a cleaning power of the cleaning device.

5. The method according to claim 1, wherein a time interval between sequential cleaning activities is increased if a determined overall contamination level is less than a defined reference contamination level.

6. The method according to claim 1, further comprising the step of chronologically delaying a planned cleaning activity if the overall contamination level deviates from an earlier overall contamination level determined before or after a previously performed cleaning activity, wherein the deviation is less than a defined reference deviation.

7. The method according to claim 1, wherein a user prescribes a defined reference contamination level and/or a defined reference deviation of an overall contamination level by transmitting the defined reference contamination level or deviation to the cleaning device via a terminal device external to the cleaning device.

8. The method according to claim 1, further comprising the step of displaying to the user in an area map both an overall contamination level of the surface and contamination levels of individual partial surface areas.

9. A cleaning device that automatically moves within an environment and which cleans a surface according to a prescribed work plan, comprising:
 a detection device that is configured for detecting contamination levels of several partial surface areas of the surface, and
 a control device configured for controlling a cleaning operation of the cleaning device as a function of a detection result of the detection device,
 wherein the control device is set up to determine an overall contamination level of the surface from the contamination levels of several partial surface areas, wherein the overall contamination level is determined by adding up the contamination levels of the several partial surface areas or by determining an average contamination level from the contamination levels of the several partial surface areas, and to control the cleaning operation with cleaning parameters corresponding to the overall contamination level for the entire surface,
 wherein the control device is configured to compare the determined overall contamination level with at least one reference contamination level corresponding to an overall contamination level determined during a chronologically preceding cleaning activity, and
 wherein the cleaning operation takes place with the same cleaning parameters for at least the several partial surface areas in which a contamination level has been detected, and wherein the cleaning operation is not individually adjusted in each individual partial surface area to the respective contamination level that prevails in the individual partial surface area.

* * * * *